US012631756B2

(12) United States Patent
Brinker et al.

(10) Patent No.: US 12,631,756 B2
(45) Date of Patent: May 19, 2026

(54) SYSTEM AND METHOD TO CLASSIFY AND REMOVE OBJECT ARTIFACTS FROM LIGHT DETECTION AND RANGING POINT CLOUD FOR ENHANCED DETECTIONS

(71) Applicant: GM Global Technology Operations LLC, Detroit, MI (US)

(72) Inventors: Michelle Marie-Clem Brinker, St. Clair, MI (US); Sai Vishnu Aluru, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 899 days.

(21) Appl. No.: 17/937,530

(22) Filed: Oct. 3, 2022

(65) Prior Publication Data
US 2024/0111056 A1     Apr. 4, 2024

(51) Int. Cl.
*G01S 17/894*          (2020.01)
*G01S 17/86*           (2020.01)

(52) U.S. Cl.
CPC ............ *G01S 17/894* (2020.01); *G01S 17/86* (2020.01)

(58) Field of Classification Search
USPC ....................................... 356/5.01
See application file for complete search history.

(56) References Cited

U.S. PATENT DOCUMENTS

| 10,929,694 | B1* | 2/2021 | Zhang ..................... G06F 18/23 |
| 2019/0391270 | A1* | 12/2019 | Uehara ................... G01S 17/04 |
| 2021/0011163 | A1* | 1/2021 | Zhang ................... G01S 13/865 |
| 2022/0270282 | A1* | 8/2022 | Akutsu ..................... G06T 7/70 |
| 2023/0122788 | A1* | 4/2023 | Meinke ................... G01S 7/497 |
| | | | 356/4.01 |
| 2023/0176218 | A1* | 6/2023 | Zeng ..................... H04N 23/90 |
| 2023/0408702 | A1* | 12/2023 | Peter .................... G01S 7/4816 |

* cited by examiner

*Primary Examiner* — Yuqing Xiao
*Assistant Examiner* — Clint Thatcher
(74) *Attorney, Agent, or Firm* — Vivacqua Crane, PLLC

(57)                    ABSTRACT

An enhanced light detection and ranging (LiDAR) assisted vehicle navigation system includes a global positioning system (GPS). A LiDAR device is in communication with the GPS generating and transmitting LiDAR signals reflected off a target proximate to a vehicle. Multiple vehicle sensors including at least a LiDAR sensor receive the LiDAR signals reflected off the target as a point cloud of data. A line profile of the target is used to identify if blooming is present. A characterization device performs a characterization analysis to identify an existence and extent of blooming of the LiDAR signals using the line profile of the target. A filter receives an output of the characterization device and removes the blooming if present to provide edge detection of the target.

12 Claims, 4 Drawing Sheets

SYSTEM AND METHOD TO CLASSIFY AND REMOVE OBJECT ARTIFACTS FROM LIGHT DETECTION AND RANGING POINT CLOUD FOR ENHANCED DETECTIONS

INTRODUCTION

The present disclosure relates to light detection and ranging (LiDAR) devices and systems used in vehicles.

Light detection and ranging (LiDAR) is a remote sensing method used for measuring an exact distance of an object on the earth's surface. LiDAR systems emit laser light onto a physical surface of an object and calculate a time the reflected light takes to return to the LiDAR source. Given a speed at which light travels of approximately 186,000 miles per second, the process of measuring an exact distance using Lidar is rapid. In automobile vehicle applications, LiDAR may be advantageously used in autonomous vehicle navigation systems to navigate environments. LiDAR systems generate millions of points, called a "point cloud" in aggregate, used to create a digital 3D map of an immediate environment about the vehicle. Pulsed lasers, global positioning systems (GPS)s, and inertial measurement units allow LiDAR sensors in the vehicles to create highly accurate point clouds.

Known LiDAR devices may suffer blooming from high intensity or retroreflective objects. Blooming can occur in a point cloud of data as a smearing of intensity (saturation) across an object, or also manifest as a protrusion or as an artifact in the data. Blooming has a negative impact on the point cloud resulting in decreased range and reflectivity accuracy and precision, increased noise rates, and potential object obscuration. Currently the LiDAR industry does not have a good way to characterize and remove blooming effects.

Thus, while current vehicle LiDAR systems achieve their intended purpose, there is a need for a new and improved LiDAR assisted vehicle navigation system.

SUMMARY

According to several aspects, an enhanced LiDAR assisted vehicle navigation system includes a global positioning system (GPS). A LiDAR device is in communication with the GPS system generating and transmitting LiDAR signals reflected off a target proximate to a vehicle. Multiple vehicle sensors including at least a LiDAR sensor receive the LiDAR signals reflected off the target as a point cloud of data. A line profile of the target is used to identify if blooming is present. A characterization device performs a characterization analyses to identify an existence and extent of blooming of eh LiDAR signals using the line profile of the target. A filter receives an output of the characterization device and removes the blooming if present to provide edge detection of the target.

In another aspect of the present disclosure, a point cloud restoration device enhancing blooming filter data and aligning multiple objects to remove noise from the point cloud to define a clean target.

In another aspect of the present disclosure, a perception device receives signal data from the point cloud restoration device and compares the signal data to the clean target, and identifies instructions to be forwarded to the GPS system and to a control system of the vehicle.

In another aspect of the present disclosure, a 3D plane-fit analyzer acquires 3 dimensions of a size of the target and generates a 3D image of an area in a path of the LiDAR signals proximate to the vehicle.

In another aspect of the present disclosure, a data serializer in communication with the 3D plane-fit analyzer converts a data object having a combination of code and data into a series of bytes to save a state of the target in a serialized form.

In another aspect of the present disclosure, a horizontal intensity and reflectivity identification determiner receives the state of the target in the serialized form; and a vertical intensity and reflectivity identification determiner operating in parallel with the horizontal intensity and reflectivity identification determiner identifies an intensity and reflectivity of the target.

In another aspect of the present disclosure: a signal to noise ratio (SNR) calculator identifies an SNR value of the point cloud of data using an output of the vertical intensity and reflectivity identification determiner and the horizontal intensity and reflectivity identification determiner; a Z-score variation evaluator receiving an output of the SNR calculator and determining a Z-score; and a peak-to-valley deviation monitor receiving an output from the Z-score variation evaluator is used to measure a difference between an ideal optic surface and an actual optic surface.

In another aspect of the present disclosure, a measurement of 3 dimensions of a target size is performed using the line profile of the target to identify a height, a width and a depth of the target.

In another aspect of the present disclosure, a most likely match between the target and one or more known objects retrieved from a database saved in a cloud or from a memory analyzed by the characterization device.

In another aspect of the present disclosure, a point cloud noise at an edge of the target is removed by the filter, the filter further decreasing a latency to recognize the target and further processing the data of the point cloud to remove point cloud noise.

According to several aspects, a method to perform enhanced LiDAR assisted vehicle navigation via a GPS (global positioning system) of a vehicle comprises: operating a LiDAR device in communication with the GPS system to generate and transmit LiDAR signals to be reflected off a target proximate to the vehicle; providing multiple vehicle sensors including at least a LiDAR sensor operating to receive the LiDAR signals reflected off the target as a point cloud of data; operating a characterization device to perform a characterization analyses using a line profile of the target to identify an existence and an extent of data blooming of the LiDAR signals; and forwarding an output of the characterization device to a filter to remove the data blooming if present and to provide edge detection of the target.

In another aspect of the present disclosure the method further includes: enhancing blooming filter data and aligning multiple objects to remove noise from the point cloud of data to define a clean target using a point cloud restoration device; and comparing the signal data to the clean target using a perception device receiving signal data from the point cloud restoration device.

In another aspect of the present disclosure, the method further includes: determining if a deviation present signal is generated by a peak-to-valley deviation monitor; and identifying coordinates of the target using a coordinate identification unit.

In another aspect of the present disclosure, the method further includes following identification of the coordinates performing noise reduction by removing points from the target data to reduce noise.

In another aspect of the present disclosure, the method further includes following the noise reduction, forwarding noise reduction data to the point cloud of data to update the point cloud of data.

In another aspect of the present disclosure, the method further includes removing a region of spillover granular light proximate to the target.

In another aspect of the present disclosure, the method further includes applying the line profile to provide object recognition and classification of objects different from the target.

According to several aspects, a method to perform enhanced LiDAR assisted vehicle navigation comprises: obtaining a line profile of a target is obtained; identifying if a data blooming is present; characterizing an extent of the data blooming using the line profile of the target; measuring 3 dimensions of target size and a measuring the 3 dimensions using the line profile of target; and implementing a filter using signal processing to remove the data blooming and improve edge detection of the target.

In another aspect of the present disclosure, the method further includes applying the line profile for object recognition and classification of objects different from the target.

In another aspect of the present disclosure, the method further includes: operating a LiDAR device in communication with the GPS system to generate and transmit LiDAR signals to be reflected off a target proximate to the vehicle; and providing multiple vehicle sensors including at least a LiDAR sensor operating to receive the LiDAR signals reflected off the target as a point cloud of data.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 2:
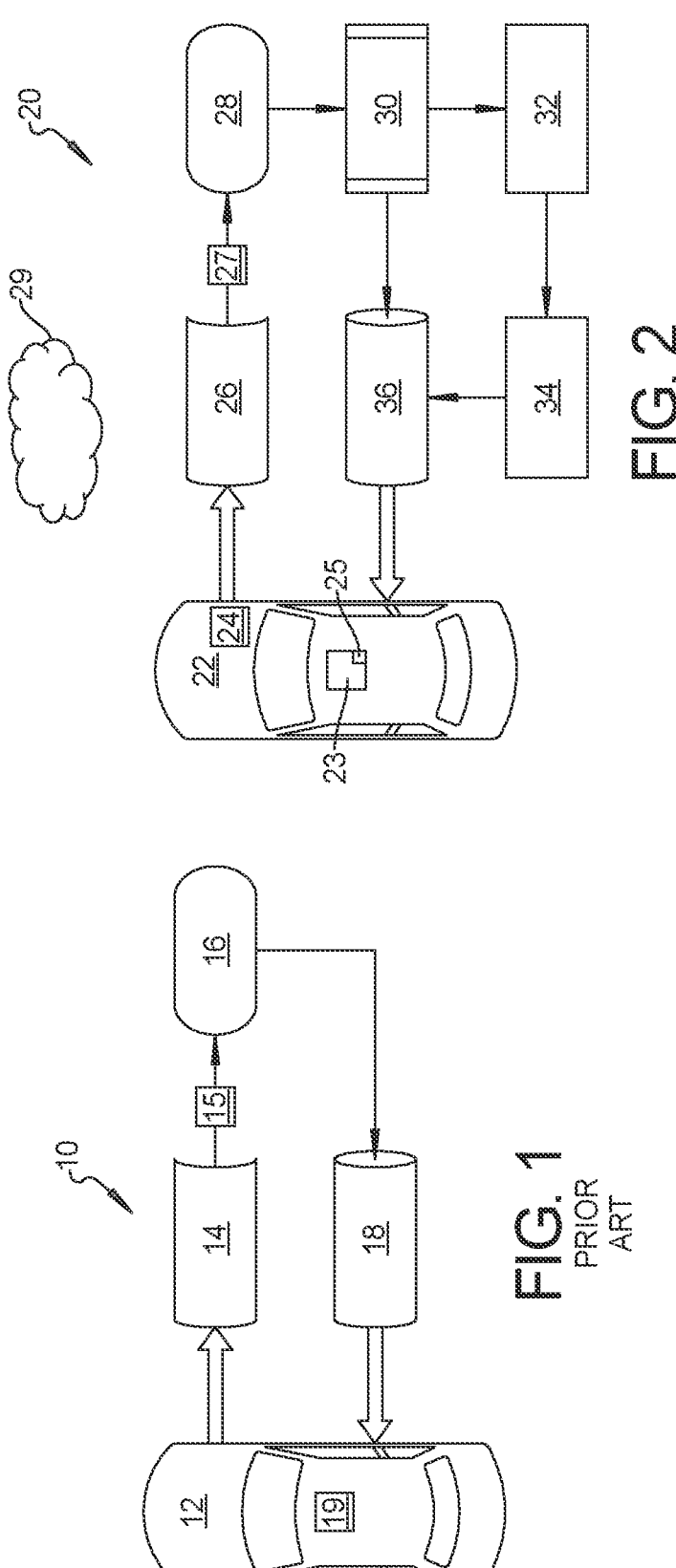
FIG. 1 is a flow diagram of a known LiDAR vehicle system.
FIG. 2 is a flow diagram of a LiDAR assisted vehicle navigation system according to an exemplary aspect.

Referring to FIG. 1, a known light detection and ranging (LiDAR) assisted navigation system 10 for a vehicle 12 such as an autonomous vehicle having a LiDAR device 14 which generates and transmits LiDAR signals. A retroreflector object 15 which may for example define a painted object such as a road sign receives and reflects the LiDAR signals as a first point cloud 16 of data. The data of the first point cloud 16 is received by a perception device 18 which generates a 3D image of an area in a path of the LiDAR signals proximate to the vehicle 12 which is used by a global positioning system (GPS) device 19 of the vehicle 12 for navigation.

Referring to FIG. 2, an enhanced LiDAR assisted vehicle navigation system 20 for a vehicle 22 such as an autonomous vehicle has a GPS system 23 in communication with multiple vehicle sensors including at least a LiDAR sensor 24. The GPS system 23 is also in communication with a memory 25 and may look-up data in the memory 25 or in a database saved in a cloud 25. The GPS system 23 communicates with a LiDAR device 26. The LiDAR device 26 generates and transmits LiDAR signals which reflect off objects and are returned to the LiDAR sensor 24 as a second point cloud 28 of data. LiDAR provides increased distance measurement compared to a vehicle camera system and a vehicle radar system. A camera system requires external illumination which is not required by the LiDAR device 26, therefore the camera system has more limited distance range compared to LiDAR signals. The LiDAR device 26 also provides greater resolution compared to a radar device. An object defining a target 27 receives and reflects the LiDAR signals as the second point cloud 28 of data which is received by the LiDAR sensor 24.

A line profile of the target 27 is taken to collect all 3 dimensions of a target size including height, width and depth, and to identify if blooming is present. Data of the second point cloud 28 of data may be accessed by the GPS system 23 and from the memory 25 to assist in identifying anticipated characteristics of the target 27. The data identifying the target 27, data from the second point cloud 28 of data and data from the memory 25 is forwarded to a characterization device 30 which compares the target 27 to characteristics of one or more known objects retrieved from a database saved in the cloud 28 or from the memory 25 and performs a characterization analyses to identify a most likely match between the target 27 and the one or more known objects retrieved from the database saved in the cloud 28 or from the memory 25. The characterization device 30 also characterizes an existence and extent of blooming using a line profile of the target 27. A measurement of 3 dimensions of a target size is also performed using a line profile of the target 27.

An output of the characterization device 30 is forwarded to a filter 32. The filter 32 uses signal processing to implement the filter 32. The filter 32 substantially removes blooming if present which improves edge detection of the target 27 using the LiDAR signal. Use of the filter 32 increases a detected range of the target 27 and a reflectivity accuracy detection of the target 27. The filter 32 also removes point cloud noise at an edge of the target 27 during and after blooming removal. The filter 32 further decreases latency to recognize the target 27 and further processes the data of the second point cloud 28 to remove point cloud noise during filtering. For symmetrical objects a line spread function of one half of the target 27 aids in achievement of all of the above functional improvements. Algorithms act on the output of the filter 32 to enhance target edge detection using the data of the second point cloud 28 and generate a 3D image of an area in a path of the LiDAR signals proximate to the vehicle 12 which is used by a GPS device 19 of the vehicle 12 for navigation.

Edge detection algorithms in a point cloud restoration device 34 may enhance blooming filter data. Multiple objects may be aligned by the point cloud restoration device 34 post blooming capture to remove noise from the second point cloud 28. The point cloud noise may then be further filtered to improve both edge detection and scene noise filtering of the LiDAR technology.

An output of the point cloud restoration device 34 is forwarded to a perception device 36. The perception device 36 receives the signal data from the point cloud restoration device 34 and compares data defining a clean detected target 27, adds data including vehicle camera data and makes a decision on instructions to be given to a control system of the vehicle 22 shown and described in reference to FIG. 3. According to several aspects, a 50 msec interval is used to capture scenes surrounding the vehicle 22 and identify instructions for vehicle operation. The decision and control solutions identified by the perception device 36 are passed to the GPS system 23 and to the control system of the vehicle 22.

Referring to FIG. 3 and again to FIG. 2, additional features of the enhanced LiDAR assisted vehicle navigation system 20 to assist in classification and removal of object artifacts may include a 3D plane-fit analyzer 38 which acquires all 3 dimensions of a size of the target 27 and generates a 3D image of an area in a path of the LiDAR signals proximate to the vehicle 22. The 3D plane-fit analyzer 38 communicates with a data serializer 40. Data serialization is a process of converting a data object having a combination of code and data into a series of bytes that saves a state of the object or target 27 in a transmittable form. In a serialized form, the data output of the data serializer 40 is forwarded for identification of intensity and reflectivity by a horizontal intensity and reflectivity identification determiner 42 and in parallel by a vertical intensity and reflectivity identification determiner 44.

A signal to noise ratio (SNR) calculator 46 identifies an SNR value of the data using the output of both the horizontal intensity and reflectivity identification determiner 42 and the vertical intensity and reflectivity identification determiner 44. The SNR value is entered into a Z-score variation evaluator 48. A Z-score is a numerical measurement describing a value's relationship to a mean of a group of values. The Z-score is measured in terms of standard deviations from the mean. For example, if a Z-score is 0, the data point's score is identical to the mean score.

An output from the Z-score variation evaluator 48 is passed to a peak-to-valley deviation monitor 50. Peak-to-valley (PV) is a parameter used to measure a difference between an ideal optic surface and an actual optic surface. Following analysis by the peak-to-valley deviation monitor 50 in a decision device 52 a determination is made if deviation is identified in the data evaluated by the peak-to-valley deviation monitor 50. If a no-deviation signal 54 is generated, the program returns to the peak-to-valley deviation monitor 50. If a deviation present signal 56 is generated the program moves on to a coordinate identification unit 58 which identifies coordinates of the target 27. The coordinate identification unit 58 also communicates with the data serializer 40.

Following coordinate identification, a noise reduction step 60 is performed by removing points from the target data to reduce noise. Following noise reduction, the data from the noise reduction step 60 is forwarded the second point cloud 28 to update data in the second point cloud 28, and in parallel the data is forwarded to a point cloud calibration device 62 which calibrates the point cloud data. The calibrated point cloud data is then forwarded to the LiDAR device 26.

Figure 3:
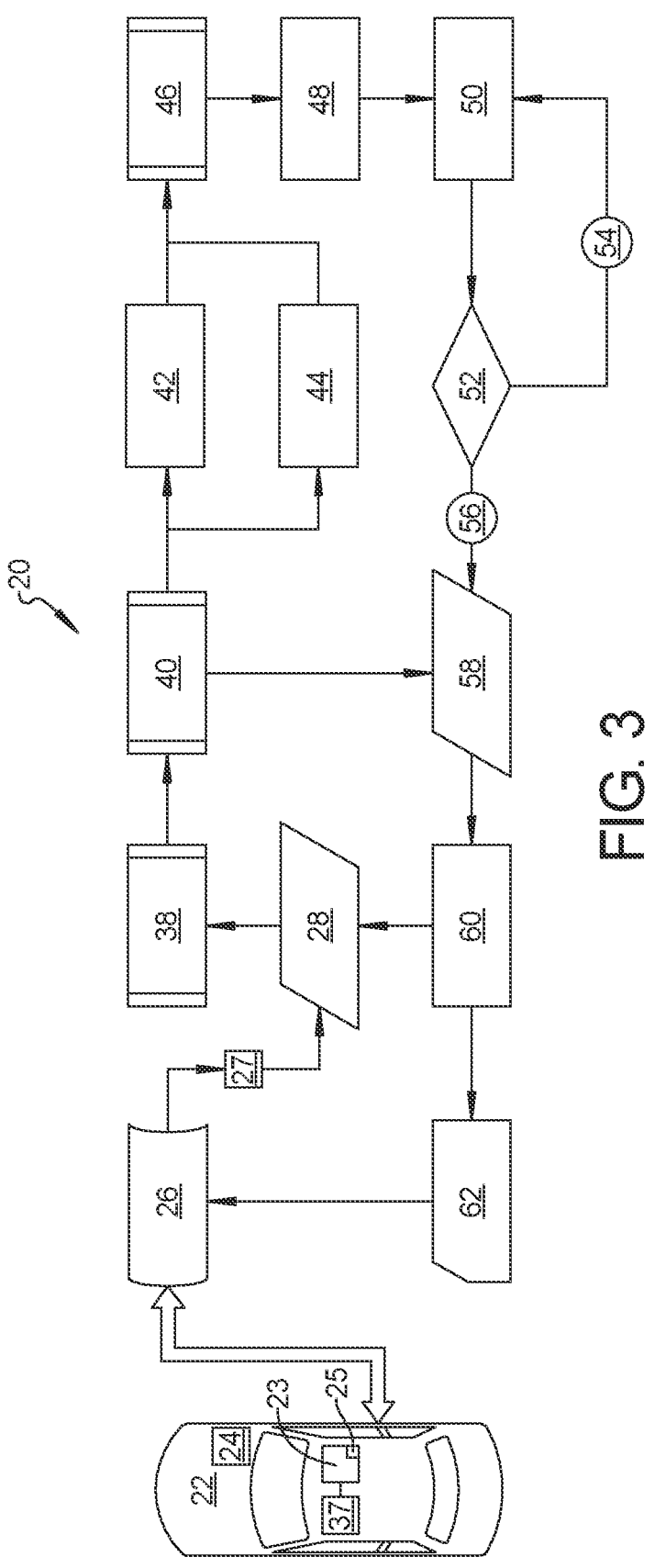
FIG. 3 is a flow diagram of the LiDAR assisted vehicle navigation system of FIG. 2 providing further functional features.

Referring to FIG. 4 and again to FIGS. 2 through 3, an exemplary retroreflector sample test plot 64 is presented demonstrating blooming occurring when LiDAR signals encounter a retroreflector 66 which may reflect 95% or more of the incoming LiDAR signals. According to several aspects the retroreflector 66 defines a rectangular-shaped sign having a defined border 68. The retroreflector 66 is positioned in front of a substantially non-reflective black surface 70 which normally absorbs substantially 95% or more or incoming energy such as LiDAR signals sent from the LiDAR device 26.

With continuing reference to FIG. 4 and again to FIG. 3, when the retroreflector 66 reflects the LiDAR signals from the target 27 back to the LiDAR sensor 24 provided in the vehicle 22, the LiDAR sensor 24 is overwhelmed with data points which spill over past the border 68 into areas defining an area of data blooming 72. The data blooming 72 obscures definition of the border 68 and therefore objects which may be located proximate to the border 68 may not be discernible. Additional areas 74 outside of the data blooming 72 define areas of up to approximately 80% reflectivity which may also be partially overlapped and obscured by the data blooming 72.

Following operation of the enhanced LiDAR assisted vehicle navigation system 20 the data blooming 72 is substantially removed which allows the LiDAR sensor 24 to distinguish the border 68. During vehicle operation, objects positioned proximate to the border 68 may then be distinguished to assist operation of the GPS system 23.

Figure 4:
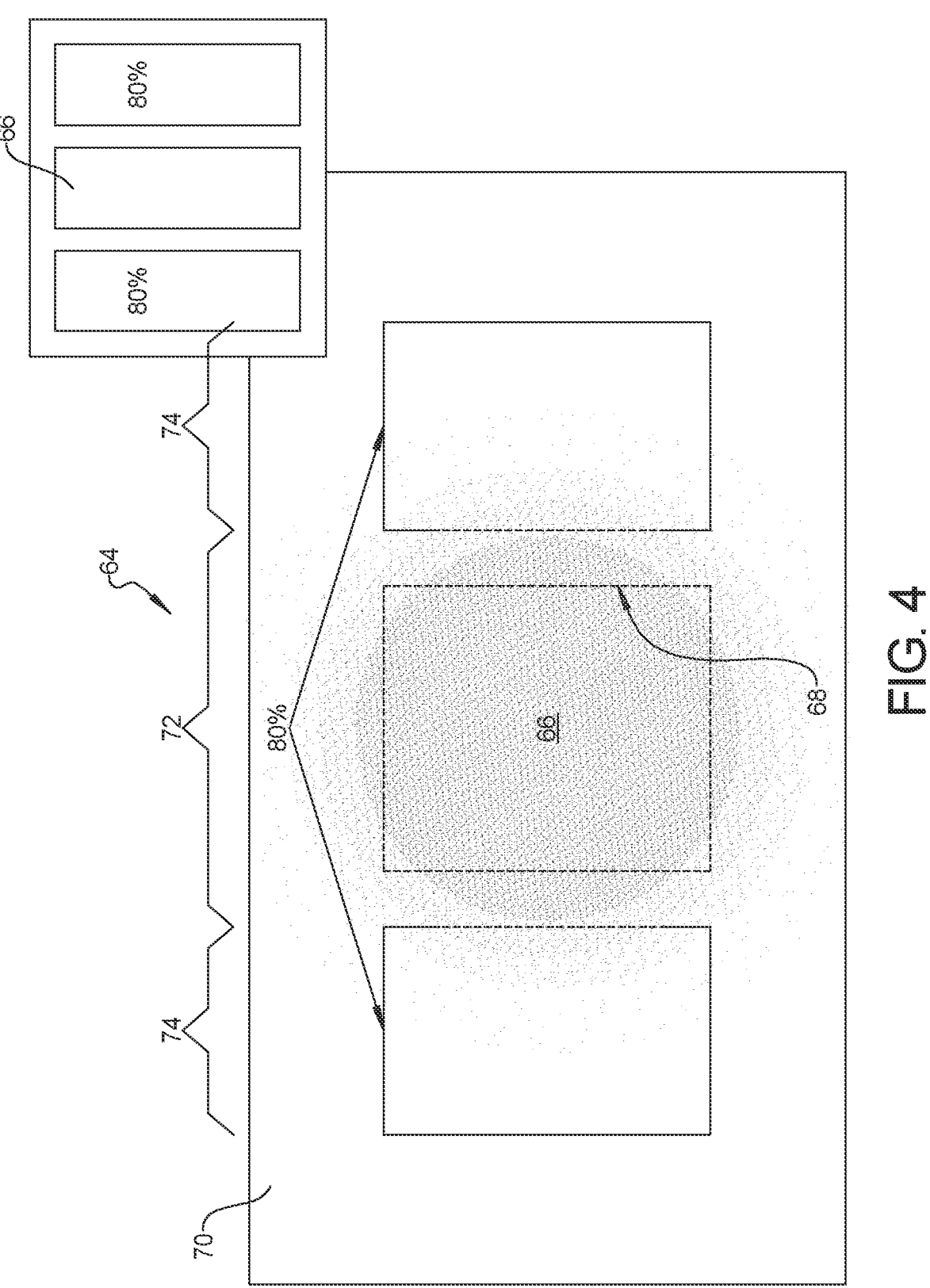
FIG. 4 is a retroreflector sample test plot demonstrating a blooming effect prior to operation of the LiDAR assisted vehicle navigation system of the present disclosure.
Figures 5, 6:
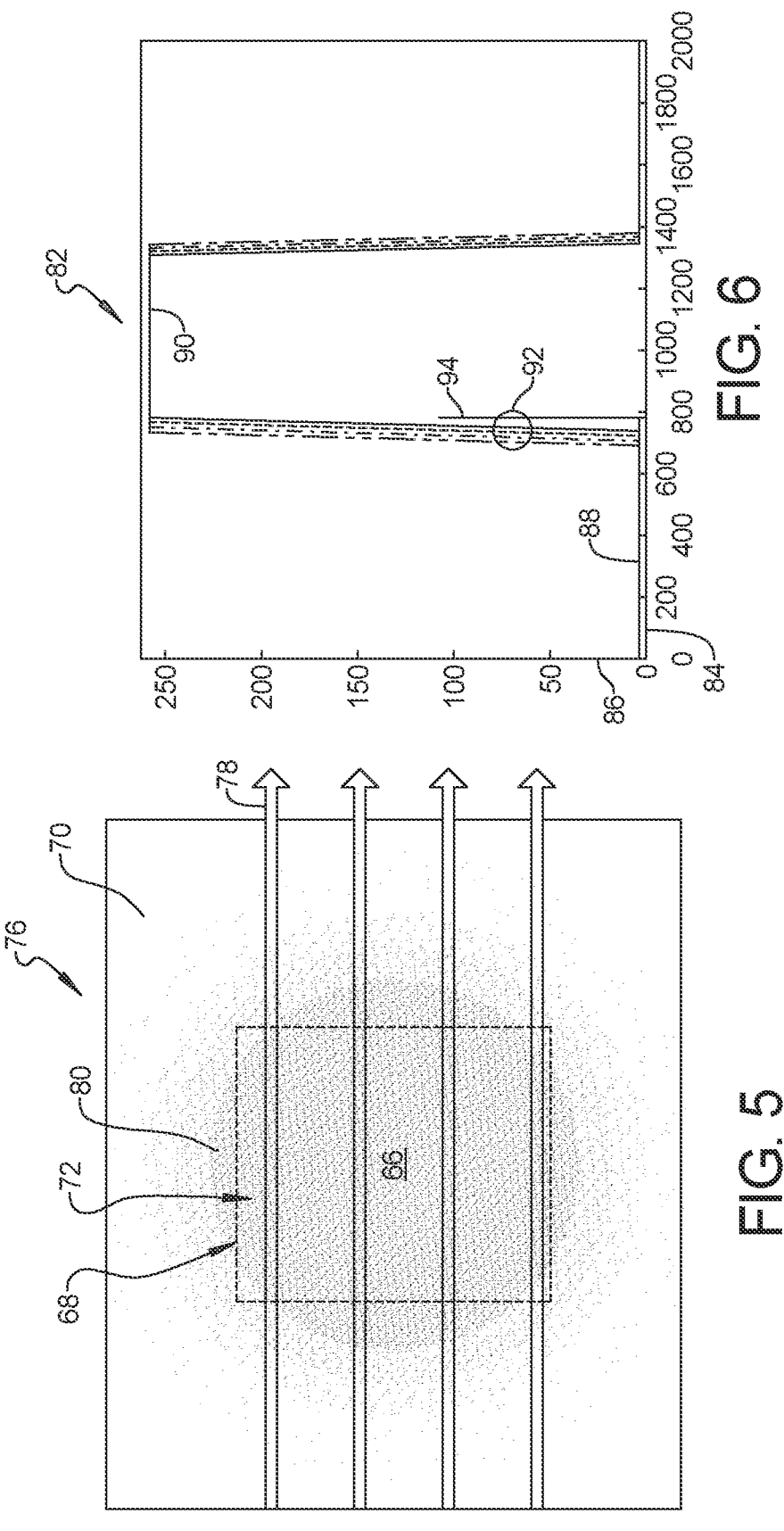
FIG. 5 is a plot of the retroreflector of FIG. 4 positioned over a black background and having exemplary LiDAR light rays directed to and reflected off the retroreflector.
FIG. 6 is a graph 82 presents an intensity of reflected LiDAR light used by to determine a line read by the LiDAR assisted vehicle navigation system of the present disclosure.

Referring to FIG. 5, a plot 76 presents the retroreflector 66 of FIG. 4 positioned over the black background 70 having exemplary LiDAR light rays 78 directed to and reflected off the retroreflector 66 and generates the data blooming 72. An area of spillover granular light 80 at a perimeter of the retroreflector 66 identifies where the data blooming 72 is occurring which obscures the border 68 of the retroreflector 66, shown in phantom in this view.

Referring to FIG. 6 and again to FIG. 5, a graph 82 presents a horizontal location 84 on the plot 76 against an intensity 86 of reflected LiDAR light to determine a line read. A minimum intensity 88 of the reflected LiDAR light is substantially zero over the black background 70 until the data blooming 72 begins to occur creating the area of spillover granular light 80. A maximum intensity 90 of reflected light indicates substantially 100% reflection of the LiDAR light directly off the retroreflector 66. A region having multiple lines of differing intensity 94 identifies light absorption or interference with light absorption in the area of the spillover granular light 80. Following operation of the enhanced LiDAR assisted vehicle navigation system 20 the data blooming 72 shown and described in reference to FIG. 5 is substantially eliminated which removes the region of spillover granular light 80 and results in a single substantially vertical light intensity 94. The border 68 will be clearly recognizable where the single substantially vertical light intensity 94 occurs.

An enhanced LiDAR assisted vehicle navigation system of the present disclosure operates as follows. Initially, a line profile of a target is obtained. The navigation system then identifies if blooming is present. The existence and extent of any blooming is then characterized using the line profile of the target. All 3 dimensions of target size are identified and a measurement of the 3 dimensions of the target size are made using the line profile of target. The line profile may also be subsequently used for object recognition and classification of objects different from the target. Signal processing is used to implement a filter which removes the blooming and improves edge detection of the LiDAR system. An increase in range identification and improved reflectivity accuracy of the target are obtained after blooming removal filter. Point cloud noise is also decreased by filter use.

A latency to recognize the object is decreased and further processing of the point cloud is then performed after blooming filtering. For symmetrical objects a line spread function of approximately one half of the object achieves of all of the above. Enhanced edge detection algorithms are developed based on the blooming filter data. Multiple objects may then be obtained post blooming removal to capture noise from the point cloud. This noise is filtered to improve both edge detection and scene noise filtering of the LiDAR system.

An enhanced LiDAR assisted vehicle navigation system of the present disclosure offers several advantages including the ability to characterize object or LiDAR blooming using a point cloud line profile assessment. Analyzing cumulative line profiles from the point cloud enables characterization of a target and objects proximate to a border of the target, as well as determination of target artifact blooming in all 3 dimensions. This quantitative characterization of the line profile assessment enables object filtering, edge detection, object and recognition and classification and improved performance.

The enhanced LiDAR assisted vehicle navigation system of the present disclosure of the present disclosure functions by taking cumulative line profiles across an extent of each target or object that enables identification of an existence of blooming and its characterization. Identifying the characterization of blooming further enables measurement of a target in 3 dimensions, object recognition and classification, blooming removal filtering, improved edge detection, and increased range and reflectivity accuracies.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An enhanced light detection and ranging (LiDAR) assisted vehicle navigation system, comprising:
   a global positioning system (GPS);
   a LiDAR device in communication with the GPS generating and transmitting LiDAR signals reflected off a target proximate to a vehicle;
   multiple vehicle sensors including at least a LiDAR sensor receiving the LiDAR signals reflected off the target as a point cloud of data;
   a line profile of the target used to identify if blooming is present;
   a characterization device performing a characterization analysis to identify an existence and extent of blooming of the LiDAR signals using the line profile of the target, wherein the characterization device includes the following:
      a 3D plane-fit analyzer acquiring 3 dimensions of a size of the target and generating a 3D image of an area in a path of the LiDAR signals proximate to the vehicle;
      a data serializer in communication with the 3D plane-fit analyzer converting a data object having a combination of code and data into a series of bytes to save a state of the target in a serialized form;
      a horizontal intensity and reflectivity identification determiner receiving the state of the target in the serialized form and a vertical intensity and reflectivity identification determiner operating in parallel with the horizontal intensity and reflectivity identification determiner to identify an intensity and reflectivity of the target;
      a signal to noise ratio (SNR) calculator identifying an SNR value of the point cloud of data using an output of the vertical intensity and reflectivity identification determiner and the horizontal intensity and reflectivity identification determiner;
      a Z-score variation evaluator receiving an output of the SNR calculator and determining a Z-score, wherein the Z-score is defined relative to a mean;
      a peak-to-valley deviation monitor receiving an output from the Z-score variation evaluator and measuring a difference between an ideal optic surface and an actual optic surface;
      a decision device receiving the output of the peak-to-valley deviation monitor and determining that blooming is identified;
      a coordinate identification unit identifying coordinates of the target when the blooming is identified; and
   a filter receiving an output of the characterization device and removing the blooming to provide edge detection of the target.

2. The enhanced light detection and ranging (LiDAR) assisted vehicle navigation system of claim 1, further including a point cloud restoration device enhancing blooming filter data and aligning multiple objects to remove noise from the point cloud to define a clean target.

3. The enhanced light detection and ranging (LiDAR) assisted vehicle navigation system of claim 2, including a perception device receiving signal data from the point cloud restoration device and comparing the signal data to the clean target, and identifying instructions to be forwarded to the GPS system and to a control system of the vehicle.

4. The enhanced light detection and ranging (LiDAR) assisted vehicle navigation system of claim 1, including a measurement of 3 dimensions of a target size performed using the line profile of the target to identify a height, a width and a depth of the target.

5. The enhanced light detection and ranging (LiDAR) assisted vehicle navigation system of claim 1, further including a most likely match between the target and one or more known objects retrieved from a database saved in a cloud or from a memory analyzed by the characterization device.

6. The enhanced light detection and ranging (LiDAR) assisted vehicle navigation system of claim 1, wherein a point cloud noise at an edge of the target is removed by the filter, the filter further decreasing a latency to recognize the target and further processing the data of the point cloud to remove point cloud noise.

7. A method to perform enhanced light detection and ranging (LiDAR) assisted vehicle navigation via a global positioning system (GPS) of a vehicle, comprising:
   operating a LiDAR device in communication with the GPS to generate and transmit LiDAR signals to be reflected off a target proximate to the vehicle;
   providing multiple vehicle sensors including at least a LiDAR sensor operating to receive the LiDAR signals reflected off the target as a point cloud of data;
   operating a characterization device to perform a characterization analysis using a line profile of the target to identify an existence and an extent of data blooming of the LiDAR signals, wherein the characterization device includes the following:

a 3D plane-fit analyzer acquiring 3 dimensions of a size of the target and generating a 3D image of an area in a path of the LiDAR signals proximate to the vehicle;

a data serializer in communication with the 3D plane-fit analyzer converting a data object having a combination of code and data into a series of bytes to save a state of the target in a serialized form;

a horizontal intensity and reflectivity identification determiner receiving the state of the target in the serialized form and a vertical intensity and reflectivity identification determiner operating in parallel with the horizontal intensity and reflectivity identification determiner to identify an intensity and reflectivity of the target;

a signal to noise ratio (SNR) calculator identifying an SNR value of the point cloud of data using an output of the vertical intensity and reflectivity identification determiner and the horizontal intensity and reflectivity identification determiner;

a Z-score variation evaluator receiving an output of the SNR calculator and determining a Z-score, wherein the Z-score is defined relative to a mean;

a peak-to-valley deviation monitor receiving an output from the Z-score variation evaluator and measuring a difference between an ideal optic surface and an actual optic surface;

a decision device receiving the output of the peak-to-valley deviation monitor and determining that blooming is identified;

a coordinate identification unit identifying coordinates of the target when the blooming is identified; and forwarding an output of the characterization device to a filter to remove the data blooming and to provide edge detection of the target.

8. The method of claim 7, further including:

enhancing blooming filter data and aligning multiple objects to remove noise from the point cloud of data to define a clean target using a point cloud restoration device; and comparing the target to the clean target using a perception device receiving signal data from the point cloud restoration device.

9. The method of claim 7, further including following identification of the coordinates performing noise reduction by removing points from the target data to reduce noise.

10. The method of claim 9, further including following the noise reduction, forwarding noise reduction data to the point cloud of data to update the point cloud of data.

11. The method of claim 7, further including removing a region of spillover granular light proximate to the target.

12. The method of claim 7, further including applying the line profile to provide object recognition and classification of objects different from the target.

* * * * *